United States Patent [19]

Ichikawa et al.

[11] Patent Number: 4,506,386
[45] Date of Patent: Mar. 19, 1985

[54] BATTERY SAVER FOR A PAGING RECEIVER OR THE LIKE

[75] Inventors: Yoshio Ichikawa; Takashi Ohyagi, both of Tokyo, Japan

[73] Assignee: NEC Corporation, Tokyo, Japan

[21] Appl. No.: 497,638

[22] Filed: May 24, 1983

[30] Foreign Application Priority Data

May 28, 1982 [JP] Japan .................... 57-90649

[51] Int. Cl.³ .................... H04B 5/04; H04B 1/16
[52] U.S. Cl. .................... 455/343; 455/228; 455/38; 340/825.44
[58] Field of Search .................... 455/38, 228, 343; 340/825.44, 825.48; 371/5, 67

[56] References Cited

U.S. PATENT DOCUMENTS

| | | | |
|---|---|---|---|
| 3,824,548 | 7/1974 | Sullivan et al. | 371/5 |
| 4,181,893 | 1/1980 | Ehmke | 455/343 |
| 4,194,153 | 3/1980 | Masaki et al. | 455/343 |
| 4,340,973 | 7/1982 | Umetsu | 455/228 |
| 4,353,065 | 10/1982 | Mori | 455/343 |
| 4,419,765 | 12/1983 | Wycoff et al. | 455/343 |
| 4,437,095 | 3/1984 | Akahori et al. | 455/38 |

FOREIGN PATENT DOCUMENTS 120748 10/1977 Japan .

*Primary Examiner*—Jin F. Ng
*Attorney, Agent, or Firm*—Sughrue, Mion, Zinn, Macpeak and Seas

[57] ABSTRACT

A battery saving circuit for use in a portable radio communication apparatus adapted to receive a communication signal which includes a preamble and identification codes. The apparatus includes a receiver section, a waveform shaper section, a decoder section and a power supply. The battery saving circuit, forming a portion of the decoder section, periodically generates a first control signal which causes the power supply to be electrically connected to the receiver and waveform shaper sections. A second control signal is generated to disconnect the receiver and waveform shaper sections from the power supply when, during an assigned time period, the preamble code is not detected. A third control signal is generated to maintain electrical connection between the power supply and the receiver and waveform shaper sections for a selected period of time after the preamble is detected.

9 Claims, 6 Drawing Figures

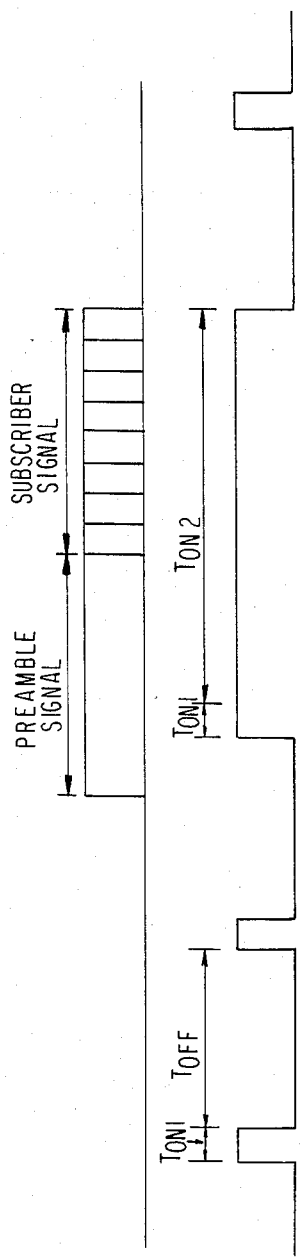
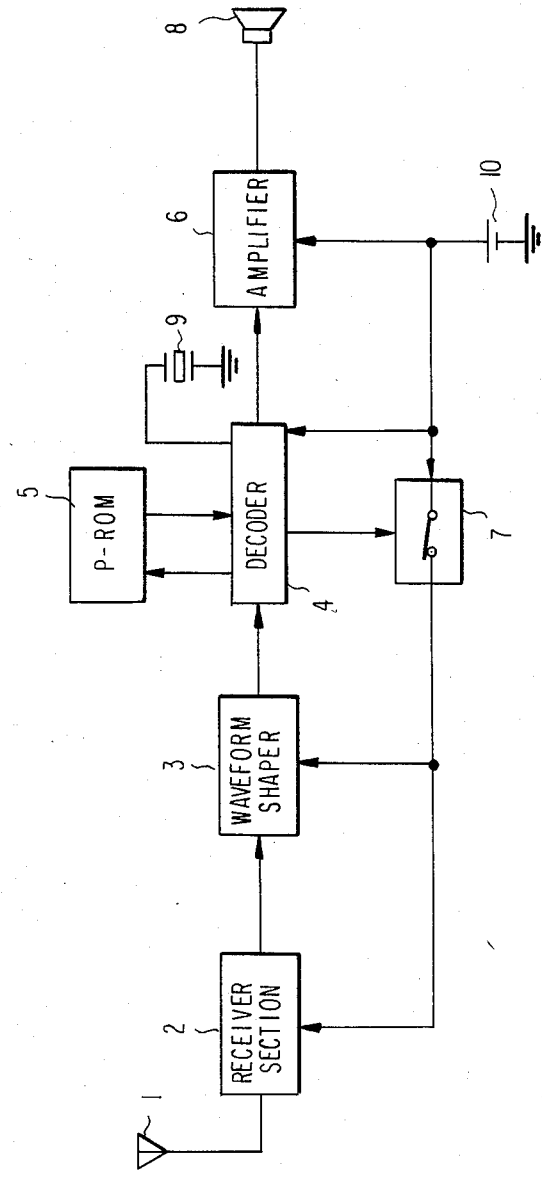
FIG. 1A
FIG. 1B
FIG. 2

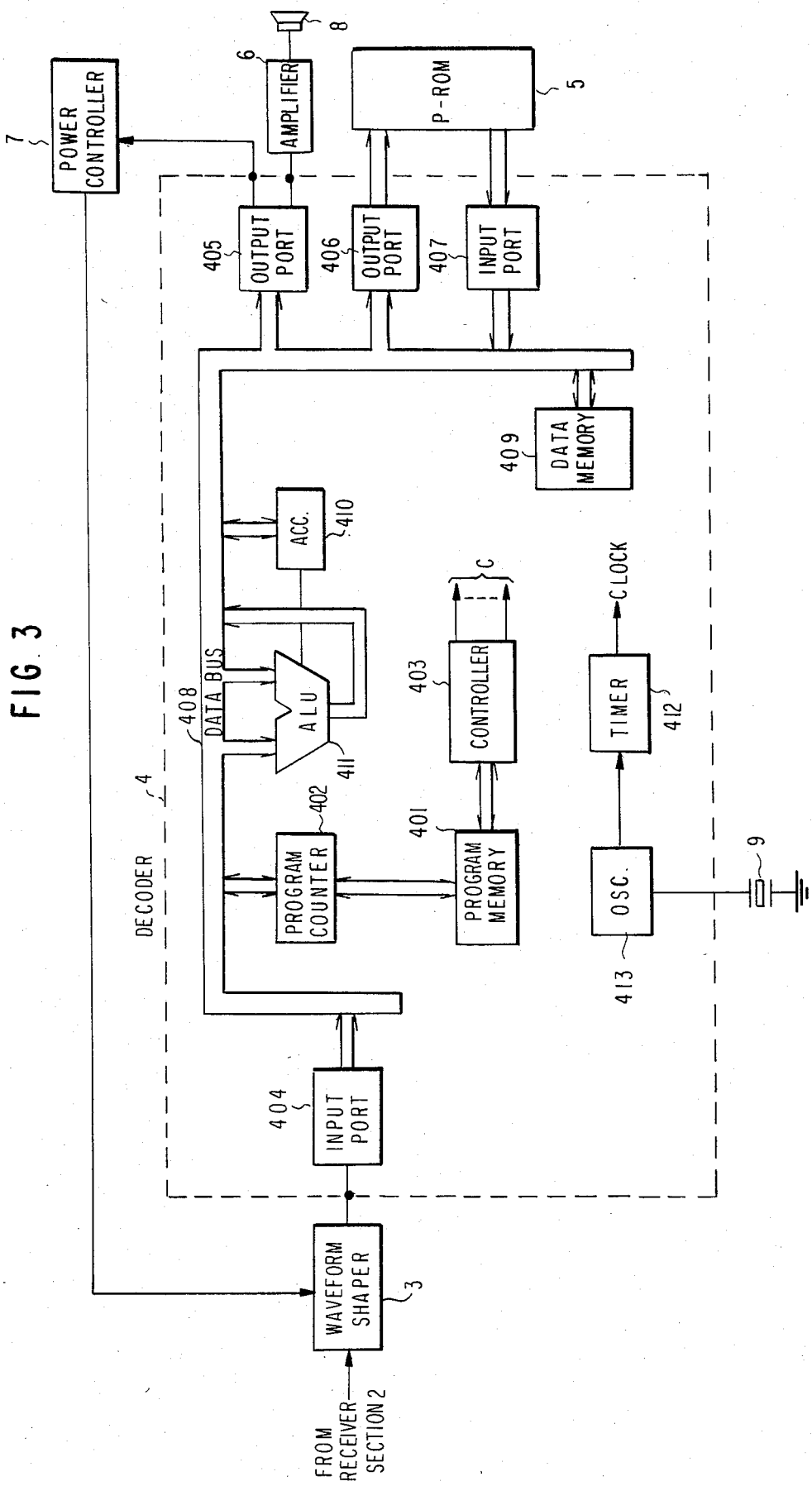

BATTERY SAVER FOR A PAGING RECEIVER OR THE LIKE

BACKGROUND OF THE INVENTION

The present invention relates to a battery saving circuit for use in a communication apparatus, such as a portable pager receiver.

In communication apparatuses including mobile radio units, such as radio paging receivers, there is used the so-called battery saving system, which periodically supplies and cuts off power to their receiver sections with a view to saving power consumption.

For instance, a transmitted signal in a paging system contains a preamble signal preceding a plurality of subscriber identification (ID) signals so that the receiver can be placed in a battery saving mode. The receiver, which periodically turns the power supply on and off, receives signals during each time period ($Ton_1$) that the power is on, and does not receive signals during each time period (Toff) that the power is off. If a preamble signal is detected during $Ton_1$, the ensuing time period of "power on" ($Ton_2$) will be extended to receive the subscriber ID signal that is to follow.

In this system, since the preamble signal is detected only once, erroneous operation may be caused by noise or other unwanted signal, resulting in low reliability. Moreover, the erroneous detection of the preamble signal deteriorates the battery saving efficiency because erroneous detection unnecessarily extends the power-on time period ($Ton_1$).

One example of a battery saving system to eliminate the foregoing disadvantages is disclosed in U.S. Pat. No. 4,181,893, issued to E. L. Ehmke on Jan. 1, 1980. According to this battery saving system, the receiver, in order to detect the ID signal, extends power supply to the receiver section in response to multiple detections of the preamble signal. This multi-detection prevents the receiver from causing erroneous operation, thereby improving the battery saving efficiency.

To carry out the first detection of the preamble, however, this battery saving system supplies power to the receiver section for a prescribed period of time regardless of the result of the first detection of the preamble signal. Therefore, this system yet has a disadvantage of lower battery saving efficiency.

SUMMARY OF THE INVENTION

An object of the present invention, therefore, is to provide a battery saving circuit which eliminates the foregoing disadvantages and further improves the battery saving efficiency.

According to one aspect of the present invention, there is provided a battery saving circuit for use in a portable radio communication apparatus, the circuit comprising receiver section means for receiving a carrier wave which is modulated with a preamble and a subscriber identification signal, power supply means for supplying power to the receiver section means in response to a first control signal, and decoder means responsive to the output of the receiver section means for detecting the received preamble and the received identification signal and selectively providing the first control signal to the power supply means. The decoder means periodically begins the application, that is the transmission, of the first control signal to the power supply means. It suspends the transmission of the first control signal in response to a second control signal, and continues said transmission of said first control signal in response to a third control signal. The decoder means immediately produces the second control signal in the absence of the preamble signal, and produces the third control signal for a first predetermined period of time in response to detection of the preamble signal.

BRIEF DESCRIPTION OF THE DRAWINGS

Other objects, features and advantages of the present invention will become more apparent from the detailed description hereunder taken in conjunction with the accompanying drawings, wherein:

FIGS. 1A and 1B are time charts illustrating a transmitted signal for a paging system to which the battery saving circuit according to the invention is applicable and the timing of a typical battery saving operation of the receiver of the system;

FIG. 2 is a block diagram of a paging receiver into which a battery saving circuit according to the invention is incorporated;

FIG. 3 is a block diagram of the decoder section of the receiver illustrated in FIG. 2.

DETAILED DESCRIPTION OF THE PREFERRED EMBODIMENT

Figure 4A:
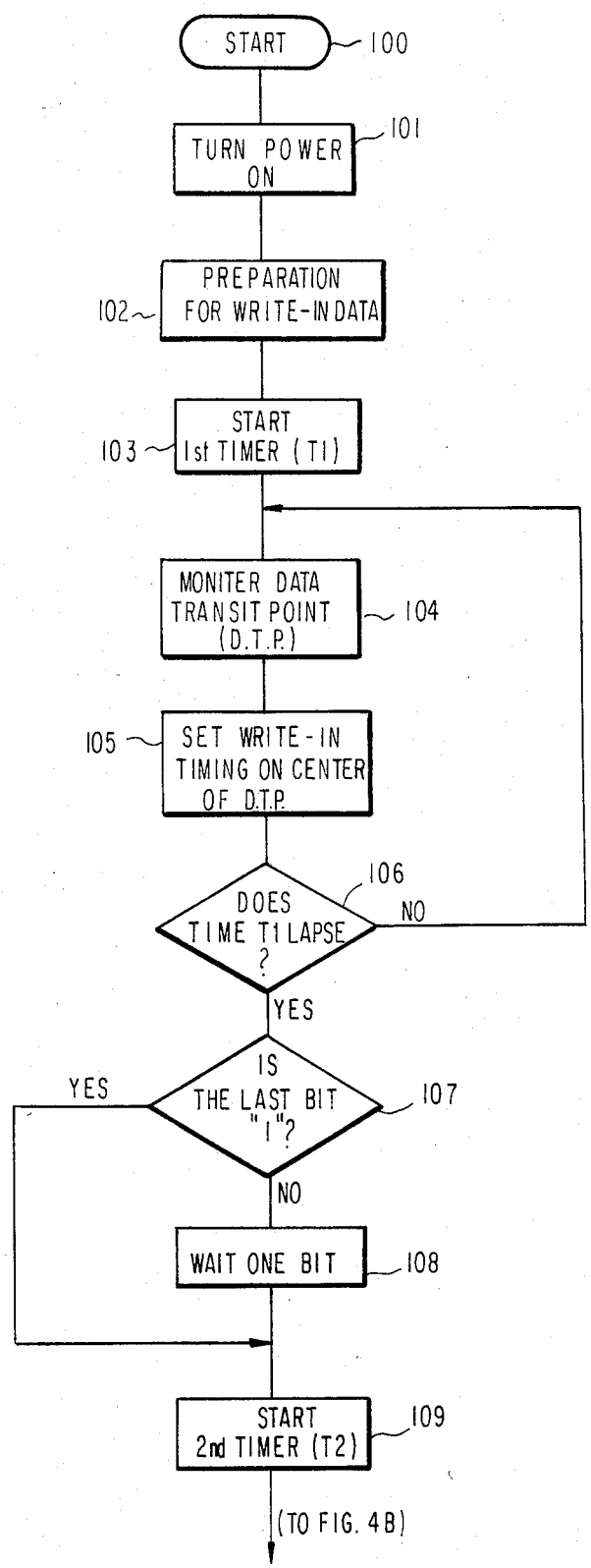
FIGS. 4A and 4B are flow charts for describing the operations of the battery saving circuit according to the invention.

Referring to FIG. 1A, in a transmitted signal for a paging system, a preamble signal is positioned before a plurality of subscriber ID signals. The receiver, as illustrated in FIG. 1B, is intermittently actuated for receiving operation only during time periods $Ton_1$. If a preamble signal is detected in one of these time periods $Ton_1$, the duration of power supply signal will be extended so that the subscriber ID signal can be detected during the next time period $Ton_2$.

According to the present invention, the battery saving efficiency ($Ton_1$/Toff) can be improved without deteriorating the capability of the preamble signal detection.

Referring now to FIG. 2, a radio carrier wave received by an antenna 1 is amplified and demodulated by a receiver section 2. The carrier wave is modulated with a preamble and subscriber ID codes or signals. The demodulated signal is converted by a waveform shaper 3 into a pulse signal decipherable by a decoder 4. The decoder 4 feeds a power supply control section 7 with a control signal for turning on and off power supply to the receiver section 2 and to the waveform shaper 3. When the control signal is at a high level, the power supply control section 7 turns on power supply to the receiver section 2 and to the waveform shaper 3. When, on the other hand, the control signal is at a low level, the control section 7 turns power supply off. When the power supply is on, the decoder 4 accomplishes decoding and, if necessary, extends the duration of the power supply.

The decoder 4 compares, during its decoding operation, a demodulated ID signal from the waveform shaper 3 with the call number of the receiver stored in advance into a programmable read only memory (P-ROM) 5. If the demodulated signal is found identical with the call number, the decoder 4 supplies a tone signal to an amplifier 6 to drive a speaker 8 to thereby alert the bearer of the receiver. A quartz oscillation element 9 is intended for generating a clock signal to actuate the decoder 4. A battery 10 is a power source for driving the whole receiver.

Next, the operation of the decoder 4 will be described in greater detail with reference to FIGS. 3, 4A and 4B. A preamble signal here consists of repetitions of logic 1's and 0's, and is so composed that it can be used for clock synchronization as well. The decoder 4 is a single-chip central processing unit (CPU), and may be provided using the μPD7502 or μPD7503 manufactured and marketed by NEC Corporation. A sequence of decoding commands is written into a program memory 401, whose content at an address corresponding to the count of a program counter 402 is supplied to a control section 403. The control section 403 sends control signals C to different parts of the decoder 4 according to the commands written in the memory 401. The program counter 402 normally adds +1 every time a content of the program memory 401 is sent to the control section 403, but it will follow any jump command or the like that may be given. Interface between external circuits and a data bus 408 is achieved through an input port 404, an output port 405, an output port 406 and an input port 407. The data bus 408 is further connected to the program counter 402, a data memory 409, an accumulator 410 and an arithmetic and logic unit (ALU) 411 for transferring data. A synchronizing clock signal required for taking data in is generated by the quartz oscillation element 9, an oscillator 413 and a timer 412.

Figure 4B:
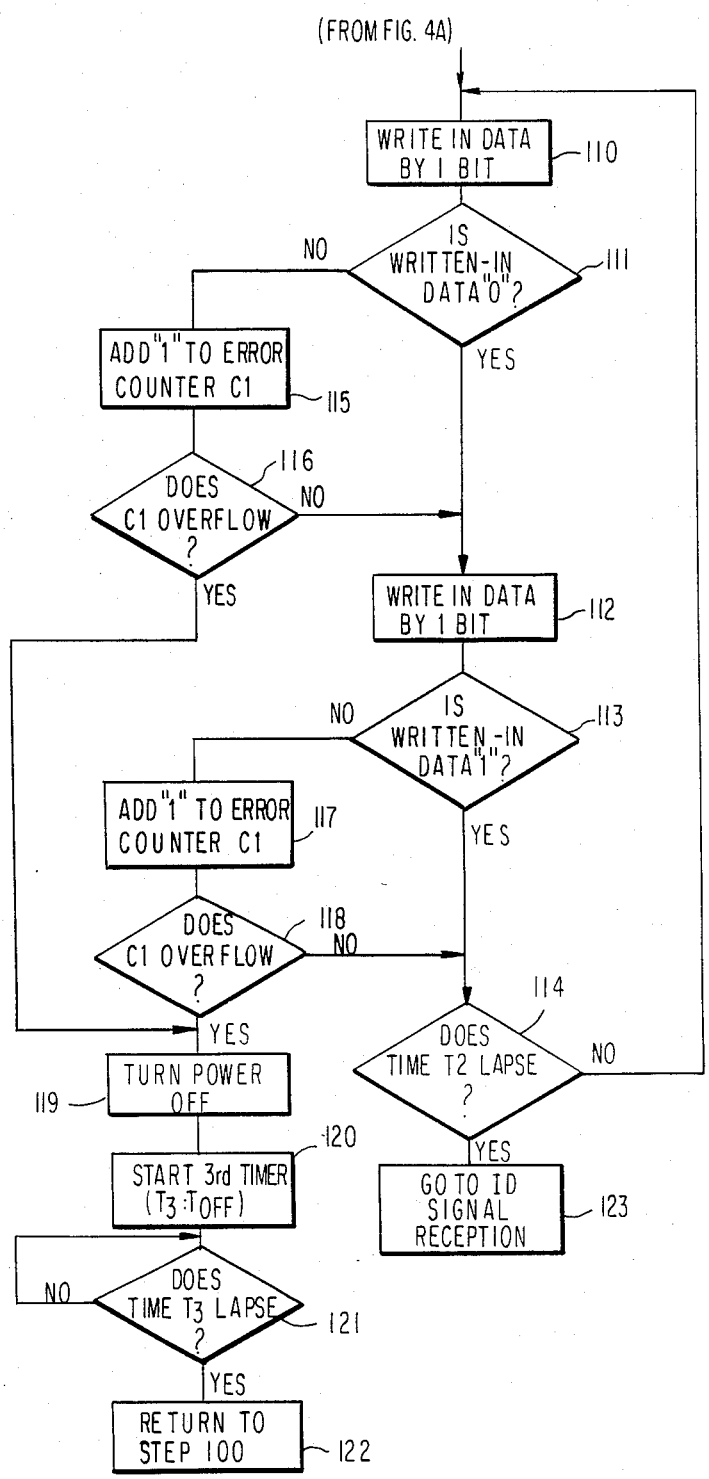

FIGS. 4A and 4B are flow charts for describing the signal receiving and battery saving operations of the decoder 4. In the description hereunder, reference numerals to steps in the flow charts will be parenthesized after the corresponding phrases or clauses thereof. When the decoder 4 is turned on (101), it stands by until the preparation for data writing-in is completed (102). This is a necessary step where the waveform shaper 3 (FIG. 2) includes an integrator circuit having a time constant for generating the reference voltage of a pulse detection comparator. Such a waveform shaper is disclosed in the Japanese Patent Application No. 51-37961 (Japanese Patent Application Disclosure No. 52-120748), assigned to the present applicant.

Upon completion of the preparation for data writing-in (102), a first timer having a time duration T1 is started (103) to monitor data transit points (DTPs) (104). Pursuant to the monitor, the decoder is synchronized with input data so that the leading or trailing edge of the clock pulse which is generated by the timer 412 for data writing-in is placed at the center between DTPs (105). This step is continued until the first timer completes its time duration T1 (106). The last bit which is supplied at the completion of the first timer time duration T1 is stored into the decoder, and it is checked whether or not the bit is "1" (107). If it is not a "1", bit the decoder 4 will wait one bit (108).

After step 107 or 108, a second timer having a time duration T2 is started (109) to detect the preamble signal. First one bit of data is written in to be checked whether or not it is a "0" bit (111) and, if it is "0", the process will move on to the writing-in of the next bit of data (112). If it is not a "0", bit +1 is added to an error counter C1 (115), and if the error counter C1 overflows (116), the power supply is suspended (119). If it does not overflow, the next bit of data is written in (112). The error counter C1 is intended for correcting any error in data. If the error counter C1 is so set as to overflow at "3" for example, it can correct two bits of error.

A third timer with time duration T3 starts after the power supply is suspended. The process, when the duration T3 lapses, returns to step 100 (120 to 122). The time duration T3 corresponds to the time duration Toff in FIG. 1.

At the next writing-in of a bit of data (112), it is checked whether or not the bit a "1" bit (113). If it is "1", the time duration T2 is counted, and before completion of the time duration T2, the decoder 4 will move on to the next step to write in data (110). If it is not a "1", bit as during the previous data writing-in, −1 is added to the error counter C1 (117). If the error counter C1 overflows (118), the power supply is turned off (119), or if it does not overflow, the process will move on again to the next data writing-in step.

In the foregoing manner, the decoder detects the coincidence between the received preamble signal and a logic I/O pattern on a bit-by-bit basis. If the coincidence ceases to be detected while the timer T2 is at work, the power supply is immediately suspended (119), and the third timer (T3) is started (120). Upon completion of the time duration T3 (121), the process returns to the step 101.

If the coincidence, i.e., the logic I/O pattern is consecutively detected while the second timer (T2) is in operation, after the completion of the time duration T2 (114), the decoder 4 will shift to the next step to receive the subscriber ID signal or call signal (123).

The time duration T2 corresponds to the time during $Ton_1$ of FIG. 1B and has to be long enough to avoid erroneous operation due to noise or some other signal. However, according to the above-mentioned process the power supply is immediately suspended when the preamble signal ceases to be detected during the timing operation by this second timer (T2). Therefore, the period during which the power supply is actually on is much shorter than the time during T2 without sacrificing immunity to erroneous operation due to noise or the like. In this embodiment of the invention, the period during which the power supply is on without any signal being received is mostly determined by the duration of stand-by to prepare for data writing-in (102) and that (T1) of the first timer's operation (103). Accordingly, the period from the start of preamble signal detection until the power turning-off upon confirmation of the absence of the preamble signal have to be no longer than one or two bits of data unless any error has to be corrected.

As hitherto described, the present invention obviates the limitation of the conventional system which necessarily requires a considerable length of time until the detection of the preamble signal and which accordingly the period during which the power supply is on cannot be substantially reduced. With this obviation, the battery saver circuit of the invention can improve its battery saving efficiency. Furthermore, as it permits the period during which the preamble signal is detected to be extended, erroneous operation owing to noise or some other signal can be prevented as well.

Although a digital code is taken up in the foregoing description as an example of selective signal, the present invention can obviously be applied to a tone signal with equally satisfactory results.

What is claimed is:

1. In a portable radio communication apparatus responsive to a digital preamble code and a digital identification code and having at least a receiving section, a power source and a battery saving circuit which produces a control signal to control the supply of power from the power source to the receiving section, said battery saving circuit including a decoder means comprising a digital data processor for detecting a first coincidence between the digital preamble code and a first predetermined digital code, and a second coincidence between the digital identification code and a second predetermined digital code, and for selectively providing said first control signal, a method for detecting said first coincidence between said digital preamble code and said first predetermined digital code and selectively providing said control signal comprising the steps of:

comparing said digital preamble code on a bit-by-bit basis with said first predetermined digital code;

producing an error signal each time corresponding bits of said digital preamble code and said first predetermined digital code do not coincide;

adding a produced error signal to previously produced error signals as soon as the error signal is produced to provide a continuously updated count of the error signals produced during the bit-by-bit comparison between digital preamble code and the first predetermined digital code; and suspending provision of said control signal as soon as counted error signals reach a preset number;

maintaining said control signal for a predetermined time when each bit of said digital preamble code coincides with each bit of said first predetermined digital code; and comparing said digital identification code with said second predetermined digital code, after coincidence between said digital preamble code and said first predetermined digital code has been determined.

2. In a portable radio communication apparatus responsive to a digital preamble code and a digital identification code and comprising, a receiver section, a power supply means, and a battery saving circuit, said battery saving circuit including decoder means selectively producing a control signal to control the supply of power from said power supply means to said receiver section, said decoder means comprising:

means for comparing the digital preamble code on a bit-by-bit basis with a first predetermined digital code;

means for producing an error signal each time corresponding bits of said digital preamble code and said first predetermined digital code do not coincide;

means for adding each produced error signal to previously produced error signals as soon as the error signal is produced to provide a continuously updated count of error signals produced during the bit-by-bit comparison of the digital preamble code with the first predetermined digital code; and means for suspending said control signal as soon as the count of said error signals reaches a preset number;

means for maintaining said control signal for a predetermined time when each bit of said digital preamble code coincides with each bit of said first predetermined digital code; and means for comparing said digital identification code with a second predetermined digital code after detecting coincidence between said digital preamble code and said first predetermined digital code.

3. A battery saving circuit for use in a portable radio communication apparatus, said apparatus including receiver section means for receiving a carrier wave which is modulated with a digital preamble and a digital identification code, and power supply means for supplying power to said receiver section means in response to a first control signal, said battery saving circuit including decoder means responsive to the output of said receiver section means for respectively detecting a first coincidence between the received preamble code and a first predetermined code and a second coincidence between the received identification code and a second predetermined code, and selectively providing said first control signal to said power supply means, wherein said decoder means further includes;

means for detecting said first coincidence on a bit-by-bit basis, means for periodically transmitting said first control signal, means for suspending said transmission of said first control signal in response to a second control signal, means for continuing said transmission of said first control signal in response to a third control signal, means for immediately producing said second control signal when said first coincidence is not detected, and means for producing said third control signal for a first predetermined period of time in response to detection of said first coincidence.

4. A battery saving circuit as claimed in claim 3, wherein said decoder means further includes means for continuing transmission of said first control signal after the lapse of said first period of time so that said decoder means can detect said second coincidence.

5. A battery saving circuit as claimed in claim 3, wherein said digital preamble code is a repetitive code of logic "1"s' and "0"s' and said decoder means further includes:

(a) means for synchronizing the clock of said battery saving circuit with a digital output from said receiver section means;

(b) first means for determining, after the establishment of synchronization, whether or not said digital output is "1";

(c) means for starting a timer having a first timer period after waiting one bit if said first determining means gives a negative result or immediately if it is in the affirmative;

(d) second means for determining, after the start of said timer, whether or not said digital output is "0";

(e) third means for determining, after the second determining means has made its determination, whether or not said digital output is "1";

(f) means for causing said second and third determining means to once again make their determinations, and (g) means for producing said second control signal to suspend the transmission of said first control signal to said power supply means when the number of negative responses produced by said second and third means have exceeded a predetermined number.

6. A battery saving circuit as claimed in claim 5, wherein said decoder means further includes means for producing said third control signal to continue transmission of said first control signal to said power supply means if the number of negative responses produced by said second and third determining means do not exceed said predetermined number and said first timer period of the time has elapsed, so that said second coincidence can be detected.

7. A method for selectively supplying power to a receiver section of a digital communication apparatus, said receiver section receiving a carrier wave which is modulated with a digital preamble and a digital identification code, said method comprising:

periodically beginning the supply of power to said receiver section;

detecting a first coincidence between the received digital preamble and a first predetermined code on a bit-by-bit basis;

stopping said supply of power if it is determined that the error number of the bit-by-bit basis detection exceeds a predetermined number; and continuing said supply of power for a first predetermined period of time if said error number is less than said predetermined number.

8. A method as claimed in claim 7 further comprising continuing said supply of power after the lapse of said first predetermined period of time for a second predetermined period of time so that said apparatus can detect a second coincidence between the received digital identification code and a second predetermined code.

9. A battery saving circuit for use in a portable radio communication apparatus, said apparatus including receiver section means for receiving a carrier wave which is modulated with a digital preamble code of logic "1"'s and "0"'s and a digital identification code, waveform shaper means for producing a digital output signal representative of said digital preamble and said digital identification codes, power supply means for supplying power to said receiver section means in response to a first control signal, and a clock means, said battery saving circuit including decoder means responsive to the output of said receiver section means for respectively detecting a first coincidence between the received preamble code and a first predetermined code and a second coincidence between the received identification code and a second predetermined code, and selectively providing said first control signal to said power supply means, wherein said decoder means further includes;

(a) means for synchronizing the clock of said battery saving circuit with a digital output from said waveform shaper means;

(b) means for detecting said first coincidence on a bit-by-bit basis, said detecting means including:

(i) first means for determining, after the establishment of synchronization, whether or not said digital output is a "1" bit;

(ii) timer means for producing a first timer period;

(iii) means for starting said timer means after waiting one bit if said first means for determining signifies said digital output is a "0" bit and for immediately starting said timer if said digital output in a "1" bit;

(iv) second means for determining, after the start of said timer, whether or not said digital output is a "0" bit;

(v) third means for determining, after the start of said timer and after determining if said digital output is a "0" bit, whether or not said digital output is "1";

(vi) means for causing said second and third determining means to repeat their operations at least one time; and (c) means for suspending the provision of said first control signal to said power supply means when said second and third determining means of said detecting means indicate at least a predetermined number of negative responses.

* * * * *